United States Patent [19]

Torvund

[11] Patent Number: 5,551,645
[45] Date of Patent: Sep. 3, 1996

[54] FISHING ROD REEL RESPOOLING DEVICE

[76] Inventor: Lawrence J. Torvund, 525 Park Blvd. #49, Ogden, Utah 84404

[21] Appl. No.: 444,568

[22] Filed: May 19, 1995

[51] Int. Cl.$^6$ .................................................. B65H 75/30
[52] U.S. Cl. ...................... 242/395; 242/396.9; 242/397; 242/399; 242/404; 242/598.1; 242/599.4; 242/902
[58] Field of Search ................................. 242/395, 395.1, 242/396.7, 396.9, 397, 397.1, 399, 404, 406, 423.1, 423.2, 598.1, 598.3, 599.4, 902

[56] References Cited

U.S. PATENT DOCUMENTS

| | | | |
|---|---|---|---|
| 606,666 | 7/1898 | Hubner | 242/395 |
| 1,830,890 | 11/1931 | Schat | 242/396.7 |
| 2,942,794 | 6/1960 | Ituso | 242/404 |
| 3,998,402 | 12/1976 | Christensen et al. | 242/399 |
| 4,151,966 | 5/1979 | Lindsay | 242/598.1 |
| 4,184,647 | 1/1980 | Rourke | 242/406 |
| 4,540,136 | 9/1985 | Rauch | 242/396.9 |
| 4,948,059 | 8/1990 | Lewitt | 242/423.2 |
| 4,948,064 | 8/1990 | Richard | 242/423.2 |
| 5,209,423 | 5/1993 | Barginear | 242/406 |

*Primary Examiner*—John M. Jillions
*Attorney, Agent, or Firm*—Workman, Nydegger & Seeley

[57] ABSTRACT

A fishing rod reel respooling device is disclosed having a hand crank for taking up line from a fishing rod reel and tensioning devices for controlling the paying out of line from the spool. A horizontally adjustable base plate has a pair of arms having pieces rising vertically therefrom that retain a line-bearing spool therebetween. The hand crank passes through both arms and the spool. A line alignment bolt having a line guide therethrough passes through both arms so as to control the paying out or taking up of line from the spool. The arms are adjustable to accommodate a great variety of different sizes of spools via arcuately adjustable hinges, a variety of corresponding holes in the arms for the hand crank and line alignment bolt, and slots in the arm which enable the two arms to move towards or away from each other to a desired adjustment width. A suction cup retains the base of the respooling device to any flat, relatively smooth surface. A horizontal stabilizer aspect of the respooling device allows the same to be adjusted parallel to the surface on which it is mounted.

20 Claims, 2 Drawing Sheets

FISHING ROD REEL RESPOOLING DEVICE

BACKGROUND OF THE INVENTION

1. The Field of the Invention

This invention relates to a spool for winding and reeling of a line, and more particularly relates to a respooling device for paying out or taking up fishing line associated with a fishing rod reel.

2. The Relevant Technology

Prior art devices used to transfer fishing line from or to a supply spool, respectively to or from a fishing reel lack diversity as to the shape and size of spool that can be accommodated. The sport of fishing employs fishing line that comes in a variety of spool sizes. These spool sizes have line types such as metallic line for deep sea fishing, spinning fishing line, bait fishing line, sink or float fly line, and other line types that are supplied on spool sizes different from those mentioned. Thus, it would be an advantage in the art to provide a respooling device capable of accommodating, through the structure of same, a great variety of spool sizes.

In addition to accommodation of different spool sizes, it is desirable to provide a respooling device that is capable of finely adjusting the tension of paying out the line from the spool. It is also desirable that the line be paid off and onto the spool through a line guide so that the winding and reeling of line from and to the spool is carefully controlled and regulated by the user.

SUMMARY AND OBJECTS OF THE INVENTION

Accordingly, the objects of this invention are achieved via a respooling device that can be secured to any flat surface. A suction cup enables the respooling device to be adhered to any relatively smooth surface such that the inventive respooling device is usable in the home, shop, on work benches, tables, walls, indoors or outdoors, and is completely operable by only one person without need for additional assistance. The horizontal orientation of the respooling device can be adjusted by horizontal stabilizers so that the position of the respooling device is parallel to the surface to which it is secured.

Each of a pair of arms has a vertically extending piece rising from a base of the respooling device. Each of the vertical pieces has a plurality of holes therethrough. A spool is accommodated between the two vertical pieces of the two arms in any two corresponding holes through which a hand crank bolt extends so as to pass through both vertical pieces as well as a center hole through the spool. A series of nuts threaded on the hand crank bolt secure the spool and the areas in their respective places. By adjusting the tension of the line using the bolts of the inventive respooling device, the line can be slowly paid off of the small spool while the fly fishing lure is made by the artisan.

The plurality of dual corresponding holes in the vertical pieces of the arms rising from the base of the respooling device can accommodate even the smallest of spool sizes. Some of the holes are off center of the vertical pieces so that a spool can be positioned forward or in the center of the arm, as is desired. An example of such a spool size is a fly fishing spool having line thereon that is used to make creative fly fishing lures. For such a use, small amounts of line is needed for fixing feathers and other fly fishing lure-related shapes and sizes to the lure. In such an application, only a small amount of line need be paid off from a small spool.

A hand crank at an end of the hand crank bolt is used, which passes through both vertical pieces of the arms and the spool, so that line can be taken up onto the spool by turning the hand crank. The tension of the line being paid off or taken up onto the spool can be adjusted via nuts that are threadingly moved along the length of the hand crank bolt against both the arms and one or more surfaces on the spool. The hand crank allows recycling of line rather than having to dispose or throw away line already wound onto a fishing rod reel. In this way, economy in the sport of fishing can be realized. It is intended that the inventive respooling device can be completely operated by one person.

The arms have slots therein to slide horizontally respectively to the base of the respooling device, and also have living hinges that arcuately flex so as to accommodate spools of a great variety of shape and size. The arms of the respooling device are rotatable in a 360° circle about the slots so as to accommodate spools of different sizes and shapes.

A line alignment bolt passes through corresponding holes in the vertical riser section of the arm. The line alignment bolt has an alignment hole therethrough, where line being paid off or onto the spool passes through the line alignment bolt so as to control the paying out or taking up of line from or to the spool.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
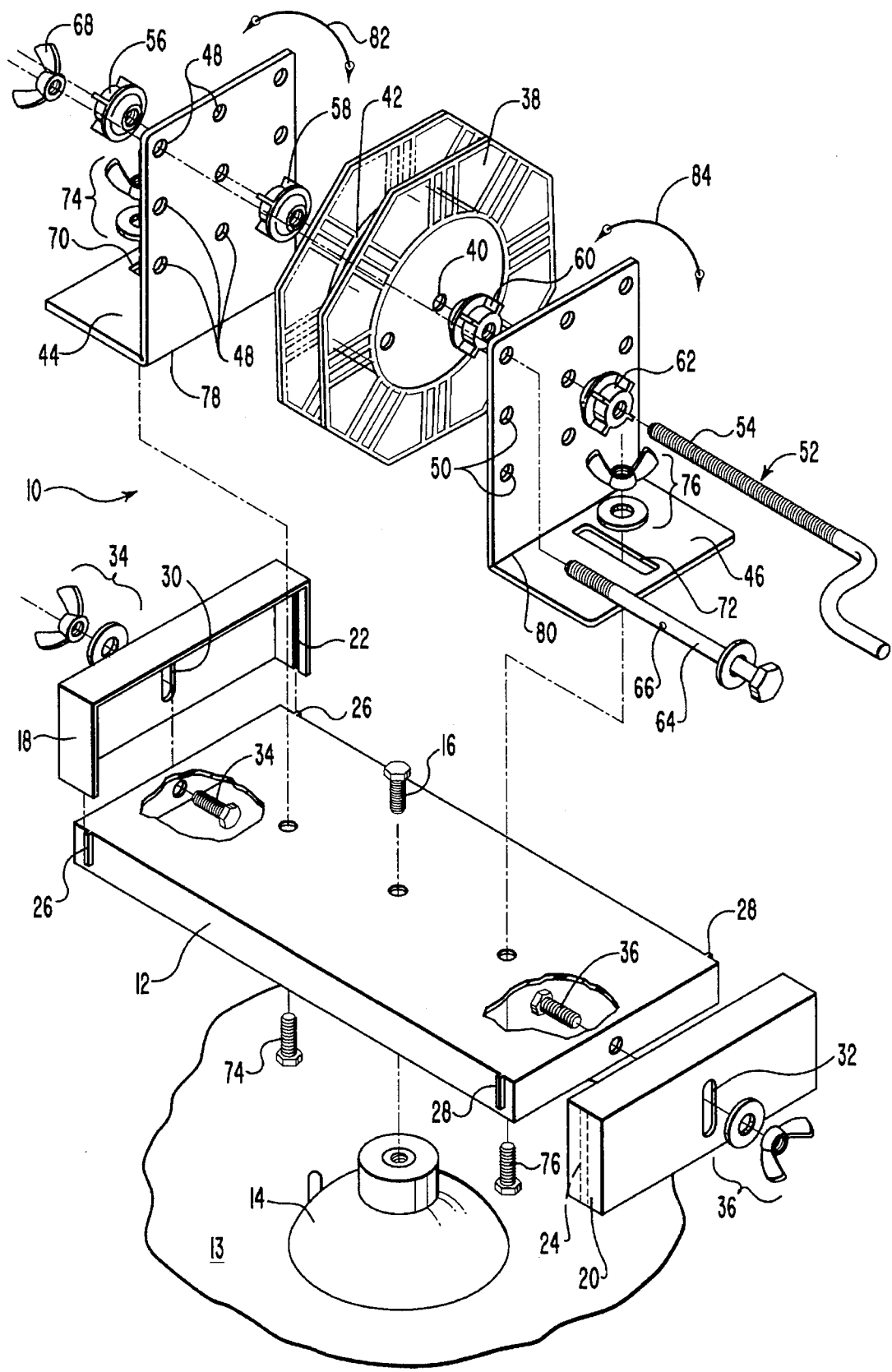
FIG. 1 is an exploded perspective view of the inventive respooling apparatus.
Figure 2:
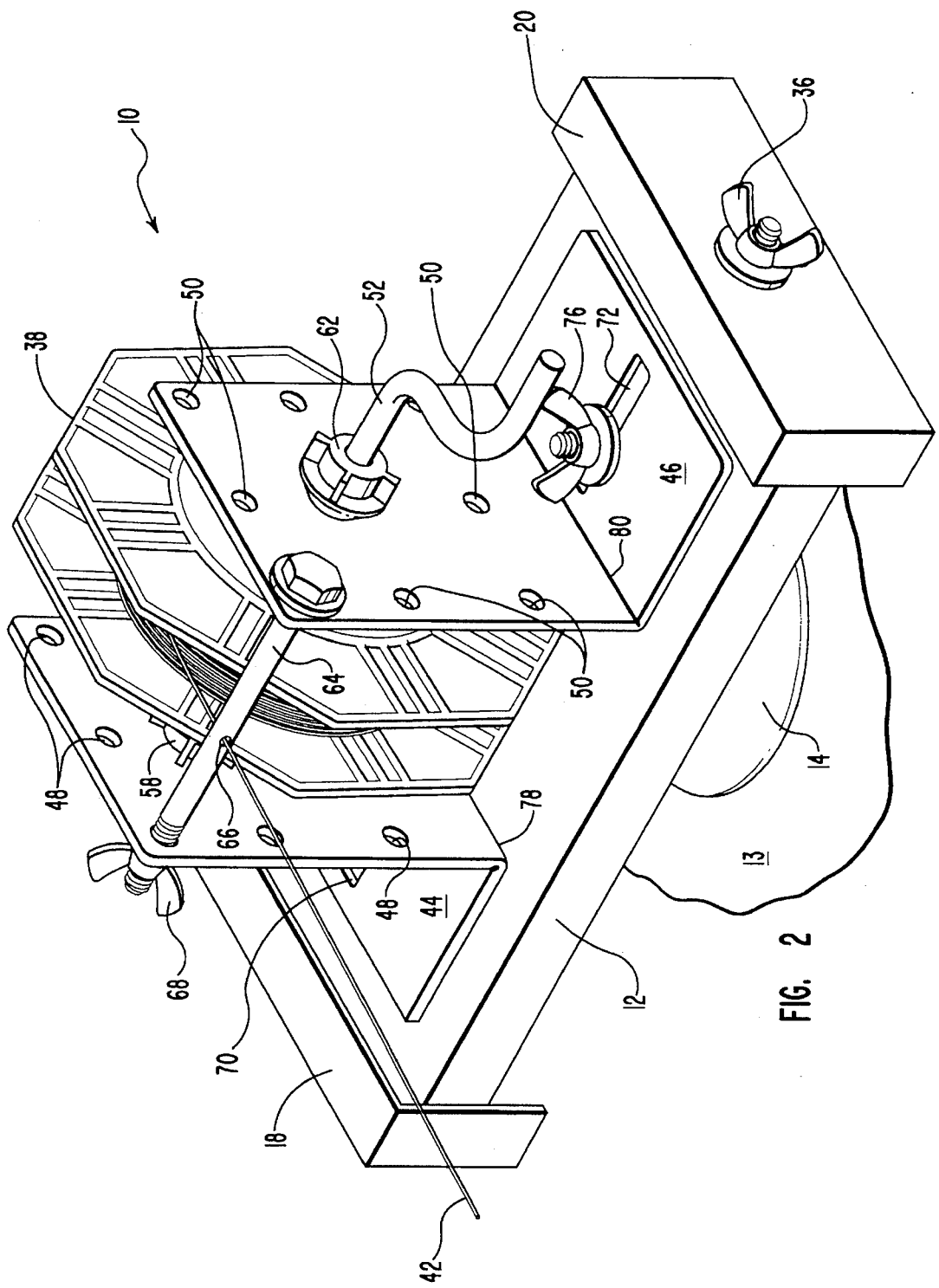
FIG. 2 is a perspective view of the respooling apparatus seen in FIG. 1.

The inventive apparatus is seen in FIGS. 1 and 2 as a respooling apparatus 10. A base plate 12 has a suction cup 14 attached in the center thereof by a fastener 16. Suction cup 14 enables base plate 12 to be attached to virtually any flat surface. The inventive respooling device can be affixed to any flat surface via the suction cup so that respooling of a fishing rod reel or the taking up of line from a fishing rod reel can be done at virtually any location, including on a boat on the water, in the home, or in other work areas. This versatility makes the chore of adding line to a fishing rod reel, or taking line off a fishing rod reel, much easier than attempting such a task with prior art devices.

First and second horizontal stabilizers 18, 20 are situated at opposite ends of base plate 12. First and second adjustment slots 30, 32 are found, respectively, within first and second horizontal stabilizers 18, 20. Fasteners 34, 36 affix the position, respectively, of horizontal stabilizers 18, 20 with respect to base plate 12 by adjustment of the same. First and second adjustment slots 30, 32 enable first and second horizontal stabilizers 18, 20 to orient base plate 12 essentially parallel to a surface 13 to which suction cup 14 is adhered. When stabilized, first and second horizontal stabilizer 18, 20 will both be in contact with surface 13.

First and second grooves 22, 24 are embedded, respectively, within first and second horizontal stabilizers 18, 20. First and second grooves 22, 24 make a conforming fit, respectively, over first and second tongues 26, 28 situated on the periphery of base plate 12. The tongue-and-groove arrangement between base plate 12 and first and second horizontal stabilizers 18, 20 prevent undesirable movement of horizontal stabilizers 18, 20 with respect to base plate 12, and thus add to the stability of the arrangement.

A spool 38 having a center bore 40 has wound thereon a line 42. On opposite sides of spool 38 there are situated a first arm 44 and a second arm 46. First arm 44 has holes 48 therethrough, and second arm 46 has holes 50 therethrough. A crank 52 has threads 54 thereon. Crank 52 passes through one of holes 50 in first arm 46, center bore 40 and spool 38, and one of holes 48 in first arm 44 so as to secure spool 38 between first arm 44 and second arm 46. Crank 52 can be placed through any two corresponding holes 48, 50, respectively, in first and second arms 44.46 so as to accommodate the size of spool 38.

Nuts 58 and 60 are tightened against spool 38 over threads 54 on crank 52 to position spool 38 with respect to a longitudinal position along crank 52. Holes 48, 50, respectively, within first and second arms 44, 46 are provided to provide a variety of dual corresponding holes therethrough to accommodate both crank 52 and a line alignment bolt 64 so that a great variety of sizes of spool 38 can be accommodated thereby. Nuts 56, 62 limit the movement, respectively, of first arm 44 and second arm 46 with respect to crank 52. It is desirable to tighten nuts 56, 62, respectively, against first arm 44 and second arm 46 as appropriate so as to make turning of crank 52 more or less difficult in the process of revolving spool 38 between first and second arms 44, 46.

Nuts 56, 58, 60, 62 are used to cause the tension to be increased at which line 42 is paid off spool 38. By way of example, when nut 56 contacts first arm 44, nut 58 contacts first arm 44 and spool 38, nut 60 contacts spool 38 and second arm 46, and nut 62 contacts second arm 46, a friction results therebetween so as to cause an increased tension at which line 42 is paid off spool 38. In this way, the paying off of line 42 from spool 38 can be tightly controlled so that excess line is not, by accident, paid off spool 38. Conversely, a loosening of nuts 56, 58, 60, 62 against the aforedescribed surfaces can cause line 42 to be easily paid off of spool 38 with little or no tension due to the absence of friction between the aforesaid surfaces. Such an arrangement may be desirable when paying line 42 off spool 38 or when taking line 42 up onto spool 38 via hand crank 52 when it is desirable to do so rapidly.

Alignment bolt 64 fits through a corresponding two of holes 48, 50, respectively, in first and second arms 44, 46. An alignment bore 66 passes through alignment bolt 64 and has an axis perpendicular to the longitudinal axis of alignment bolt 64. The purpose of alignment bore 66 is to serve as an alignment For line 42 paying off or paying onto spool 38. A Fastener 68 retains line alignment bolt 64 on first and second arms 44, 46.

As seen in FIG. 1, a living hinge 78 enables first arm 44 to move arcuately as indicated by directional arrows 82, and a living hinge 80 enables second arm 46 to move arcuately as indicated by directional arrows 84. The arcuate movement of first arm 44 and second arm 46 enables the accommodation of wide or narrow spools 38 therebetween.

First arm 44 has a first slot 70 and second arm 46 has a second slot 72. First and second slots 70, 72, respectively, enable first arm 44 and second arm 46 to slide over the surface of base plate 12 into a desirable position relative thereto. The desirable position of first arm 44 and second arm 46 is secured to base plate 12, respectively, by Fasteners 74, 76. First and second slots 70, 72 allow first arm and second arm 44, 46 to accommodate narrow and wide sizes of spool 38. First and second arms 44, 46 can also swivel 180° from their position as seen in the figures, about slots 70, 72, so as to accommodate a much larger spool than that which is depicted in the figures.

From the foregoing, it is contemplated that the inventive respooling device is capable of accommodating a great variety of fishing line spools in different shapes and sizes by the combination of living hinges, rotatable arms, multiple dual corresponding holes in the vertical pieces of the arms, and horizontally sliding the arms by slots therein along the surface of the base plate to a desired location where they are secured to the base plate. Of course, the respooling device can be used for a spool not necessarily related to the sport of fishing and it is contemplated that its use is not so limited.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A spooling device for dispensing and taking up a quantity of a line comprising:
 (a) a support plate including:
  (1) means for attaching said support plate to a mounting surface; and
  (2) means for adjustably stabilizing a plane of said support plate into a position that is parallel to a plane of said mounting surface;
 (b) a first bracket mounted by a first base plate to said support plate and having a first upright end plate with a bearing surface thereon;
 (c) a second bracket mounted by a second base plate to said support plate and having a second upright end plate with a bearing surface thereon opposing the bearing surface of the first upright end plate;
 (d) means for adjusting the distance between the opposing bearing surfaces of said first and second upright end plates by adjusting the position of at least one of the first and second base plates on the support plate;
 (e) a spool having opposing flanges rotatably carried between the opposing bearing surfaces of said first and second upright end plates;
 (f) a supply of line disposed between the opposing flanges of said spool and adapted to be withdrawn from and taken up upon said spool as said spool rotates; and
 (g) adjustable means for operably coupling said spool and said first and second brackets.

2. The spooling device as defined in claim 1, further comprising means, positioned away from the opposing flanges of said spool, for guiding said line onto and off of said spool between said opposing flanges.

3. The spooling device as defined in claim 2, wherein said means for guiding said line onto and off of said spool comprising a member extending through both said first and second upright end plates and having a bore therethrough for passing said line therethrough.

4. The spooling device as defined in claim 1, wherein the adjustable means for operably coupling said spool and said first and second brackets extends through a pair of corresponding opposing holes in the first and second upright end plates.

5. The spooling device as defined in claim 1, wherein the first and second upright end plates have therethrough a plurality of pairs of corresponding opposing holes, each said pair of said plurality of pairs being capable of accepting therethrough said adjustable means for operably coupling said spool and said first and second brackets, whereby the first and second upright end plates may accommodate therebetween spools of varied sizes.

6. The spooling device as defined in claim 1, wherein the adjustable means for operably coupling said spool and said first and second brackets comprises:
    (a) means for applying a rotational force to said spool; and
    (b) means for applying an adjustable frictional force simultaneously on one or more of said flanges of said spool and on one or more of said first and second upright end plates so as to control a rate of line withdrawal from and take up on said spool as a rotational force is applied to said spool.

7. The spooling device as, defined in claim 6, wherein the means for applying a rotational force to said spool is a hand crank about which the spool is rotatably journaled, said hand crank passing also through said first and second upright end plates.

8. The spooling device as defined in claim 7, wherein the means for applying an adjustable frictional force simultaneously on one or more of said flanges of said spool and on one or more of said first and second upright end plates comprises: a plurality of nuts threadably engaged over an exterior thread on said hand crank.

9. The spooling device as defined in claim 8, wherein the plurality of nuts comprises a first nut disposed between the bearing surface of said first upright end plate and a flange of said spool, a second nut disposed between the bearing surface of said second upright end plate and a flange of said spool a third nut disposed opposite the bearing surface of said first upright end plate, and a fourth nut disposed opposite the bearing surface of said second upright end plate.

10. The spooling device as defined in claim 1, wherein the first base plate is hinged to the first upright end plate so as to vary the angle between the first base plate and the first upright end plate, whereby the distance between the opposing bearing surfaces of said first and second upright end plates is adjusted by the hinge of the first brackets.

11. The spooling device as defined in claim 1, wherein the first base plate is hinged to the first upright end plate so as to vary the angle between the first base plate and the first upright end plate, wherein the second base plate is hinged to the second upright end plate so as to vary the angle between the second base plate and the second upright end plate, whereby the distance between the opposing bearing surfaces of said first and second upright end plates is adjusted by one or more of the hinges of the first and second brackets.

12. The spooling device as defined in claim 1, wherein the means for attaching said support plate to a mounting surface is a suction cup affixed to said support plate.

13. The spooling device as defined in claim 1, wherein the means for stabilizing said support plate parallel to a plane of said mounting surface comprises:
    (a) a first leg mounted at a first end of said support plate; and
    (b) a second leg mounted at an opposite second end of said support plate, said first and second legs being adjustable in a direction essentially perpendicular to a plane of said support plate so as to make contact with said mounting surface; whereby the plane of said support plate is stabilized in a position parallel to a plane of said mounting surface by the adjustment of said first and second legs.

14. The spooling device as defined in claim 13, wherein the movement of the first and second legs relative to the plane of the support plate is limited by a tongue and groove mating relationship therebetween.

15. The spooling device as defined in claim 13, wherein the first leg has a slot therethrough having a fastener extending through both the slot and the support plate to secure the first leg to the support plate, the slot permitting the first leg to move essentially perpendicular to the plane of the support plate when the fastener is loose with respect to the first leg and the support plate.

16. The spooling device as defined in claim 15, wherein the fastener comprises a threaded bolt having wingnut threaded thereover.

17. The spooling device as defined in claim 15, wherein the second leg has a slot therethrough having a fastener extending through both the slot thereof and the support plate to secure the second leg to the support plate, the slot thereof permitting the second leg to move essentially perpendicular to the plane of the support plate when the fastener therethrough is loose with respect to the second leg and the support plate.

18. The spooling device as defined in claim 17, wherein the fastener through said second leg comprises a threaded bolt having wingnut threaded thereover.

19. A spooling device for dispensing and taking up a quantity of a line comprising:
    (a) a support plate comprising:
        (1) means for attaching said support plate to a mounting surface; and
        (2) means for adjustably stabilizing a plane of said support plate into a position that is parallel to a plane of said mounting surface comprising:
            (a) a first leg mounted at a first end of said support plate; and
            (b) a second leg mounted at an opposite second end of said support plate, said first and second legs being adjustable in a direction essentially perpendicular to a plane of said support plate so as to make contact with said mounting surface, whereby the plane of said support plate is stabilized in a position parallel to a plane of said mounting surface by the adjustment of said first and second legs;
    (b) a first bracket mounted by a first base plate to said support plate and having a first upright end plate with a bearing surface thereon;
    (c) a second bracket mounted by a second base plate to said support plate and having a second upright end plate with a bearing surface thereon opposing the bearing surface of the first upright end plate;

(d) means for adjusting the distance between the opposing bearing surfaces of said first and second upright end plates by adjusting the position of at least one of the first and second base plates on the support plate;

(e) a spool having opposing flanges rotatably carried between the opposing bearing surfaces of said first and second upright end plates;

(f) a supply of line disposed between the opposing flanges of said spool and adapted to be withdrawn from and take up upon said spool as said spool rotates; and (g) adjustable means, extending through a pair of corresponding opposing holes in the first and second upright end plates, for operably coupling said spool and said first and second brackets, and comprising a hand crank for applying a rotational force to said spool and about which the spool is rotatably journaled, said hand crack having a plurality of nuts threadably engaged over an exterior thread on said hand crank, said plurality of nuts applying an adjustable frictional force simultaneously on one or more of said flanges of said spool and on one or more of said first and second upright end plates so as to control a rate of line withdrawal from and take up on said spool as a rotational force is applied to said spool, said first and second upright end plates having therethrough a plurality of pairs of corresponding opposing holes, each said pair of said plurality of pairs being capable of accepting therethrough said adjustable means for operably coupling said spool and said first and second brackets, whereby the first and second upright end plates may accommodate therebetween spools of varied sizes.

20. A spooling device for dispensing and taking up a quantity of a line comprising:

(a) a support plate comprising:
  (1) means for attaching said support plate to a mounting surface; and
  (2) means for adjustably stabilizing a plane of said support plate into a position that is parallel to a plane of said mounting surface comprising:
    (a) a first leg mounted at a first end of said support plate; and
    (b) a second leg mounted at an opposite second end of said support plate, said first and second legs being adjustable in a direction essentially perpendicular to a plane of said support plate so as to make contact with said mounting surface; whereby the plane of said support plate is stabilized in a position parallel to a plane of said mounting surface by the adjustment of said first and second legs;

(b) a first bracket mounted by a first base plate to said support plate and having a first upright end plate with a bearing surface thereon, the first base plate being hinged to the first upright end plate so as to vary the angle between the first base plate and the first upright end plate;

(c) a second bracket mounted by a second base plate to said support plate and having a second upright end plate with a bearing surface thereon opposing the bearing surface of the first upright end plate, the second base plate being hinged to the second upright end plate so as to vary the angle between the second base plate and the second upright end plate, whereby the distance between the opposing bearing surfaces of said first and second upright end plates is adjusted by one or more of the hinges of the first and second brackets;

(d) means for adjusting the distance between the opposing bearing surfaces of said first and second upright end plates by adjusting the position of at least one of the first and second base plates on the support plate;

(e) a spool having opposing flanges rotatably carried between the opposing bearing surfaces of said first and second upright end plates;

(f) a supply of line disposed between the opposing flanges of said spool and adapted to be withdrawn from and take up upon said spool as said spool rotates; and (g) adjustable means, extending through a pair of corresponding opposing holes in the first and second upright end plates, for operably coupling said spool and said first and second brackets, and comprising a hand crank for applying a rotational force to said spool and about which the spool is rotatably journaled, said hand crack having a plurality of nuts threadably engaged over an exterior thread on said hand crank, said plurality of nuts applying an adjustable frictional force simultaneously on one or more of said flanges of said spool and on one or more of said first and second upright end plates so as to control a rate of line withdrawal from and take up on said spool as a rotational three is applied to said spool, said first and second upright end plates having therethrough a plurality of pairs of corresponding opposing holes, each said pair of said plurality of pairs being capable of accepting therethrough said adjustable means for operably coupling said spool and said first and second brackets, whereby the first and second upright end plates may accommodate therebetween spools of varied sizes.

* * * * *